United States Patent
Feuillade et al.

(10) Patent No.: US 12,263,655 B2
(45) Date of Patent: Apr. 1, 2025

(54) METHOD FOR THE MANUFACTURING OF AN OPTICAL ELEMENT, OPTICAL ELEMENT THUS OBTAINED

(71) Applicant: Essilor International, Charenton-le-Pont (FR)

(72) Inventors: Mathieu Feuillade, Charenton-le-Pont (FR); Pierre Fromentin, Bangkok (TH); Maxime Lecompere, Charenton-le-Pont (FR); Pierre Leite, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 514 days.

(21) Appl. No.: 17/282,693

(22) PCT Filed: Oct. 3, 2019

(86) PCT No.: PCT/EP2019/076831
§ 371 (c)(1),
(2) Date: Apr. 2, 2021

(87) PCT Pub. No.: WO2020/070253
PCT Pub. Date: Apr. 9, 2020

(65) Prior Publication Data
US 2021/0379846 A1     Dec. 9, 2021

(30) Foreign Application Priority Data
Oct. 5, 2018 (EP) .................................. 18306315

(51) Int. Cl.
*B29D 11/00* (2006.01)
*B29C 64/112* (2017.01)
(Continued)

(52) U.S. Cl.
CPC ...... *B29D 11/00355* (2013.01); *B29C 64/112* (2017.08); *G02C 7/04* (2013.01); *B33Y 10/00* (2014.12)

(58) Field of Classification Search
CPC ... B29D 11/00355; B29C 64/112; G02C 7/04; B33Y 10/00
See application file for complete search history.

(56) References Cited

U.S. PATENT DOCUMENTS

2014/0378628 A1* 12/2014 Aoki ...................... C08G 75/28
525/535
2015/0277150 A1   10/2015 Granger et al.
(Continued)

FOREIGN PATENT DOCUMENTS

| EP | 2 236 539 | 10/2010 |
| EP | 2 980 113 | 2/2016 |
| WO | 2017/099130 | 6/2017 |

OTHER PUBLICATIONS

McNaught et al., "Gel Point", IUPAC. Compendium of Chemical Terminology, 2nd ed. (the "Gold Book"). 2014, <https://goldbook.iupac.org/html/G/GT07535.html>, 1 page.
(Continued)

*Primary Examiner* — Larry W Thrower
(74) *Attorney, Agent, or Firm* — NIXON & VANDERHYE

(57) ABSTRACT

Disclosed is a method for the manufacturing of an optical element having a refractive index above 1.59 by additive manufacturing to the optical element obtained by such a method and to an ophthalmic lens including such an optical element.

16 Claims, 1 Drawing Sheet

Figure 1:
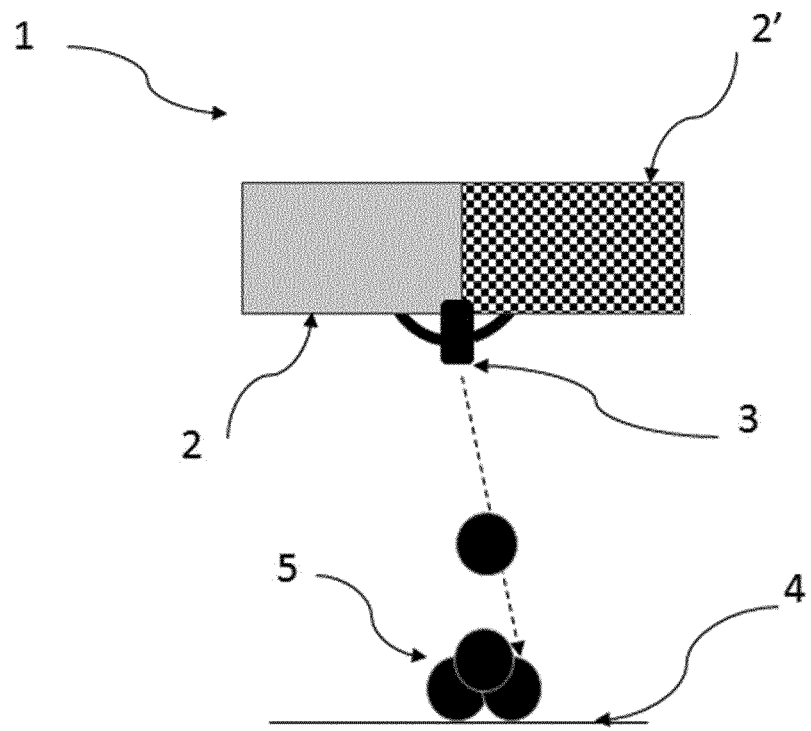

(51) Int. Cl.
*G02C 7/04* (2006.01)
*B33Y 10/00* (2015.01)

(56) References Cited

U.S. PATENT DOCUMENTS

| | | | |
|---|---|---|---|
| 2016/0167299 A1* | 6/2016 | Jallouli | B29D 11/00009 |
| | | | 264/2.6 |
| 2016/0280840 A1 | 9/2016 | Murakami | |
| 2017/0008228 A1* | 1/2017 | Iwata | B29C 64/129 |
| 2017/0015777 A1* | 1/2017 | Tsukada | C08G 18/022 |

OTHER PUBLICATIONS

International Search Report for PCT/EP2019/076831 dated Dec. 6, 2019, 3 pages.
Written Opinion of the ISA for PCT/EP2019/076831 dated Dec. 6, 2019, 5 pages.
Extended European Search Report for EP 18 30 6315 dated Mar. 14, 2019, 5 pages.

* cited by examiner

METHOD FOR THE MANUFACTURING OF AN OPTICAL ELEMENT, OPTICAL ELEMENT THUS OBTAINED

CROSS-REFERENCE TO RELATED APPLICATIONS

This application is the U.S. national phase of International Application No. PCT/EP2019/076831 filed Oct. 3, 2019 which designated the U.S. and claims priority to EP 18306315.5 filed Oct. 5, 2018, the entire contents of each of which are hereby incorporated by reference.

TECHNICAL FIELD

The present invention belongs to the field of optical devices, in particular in the field of manufacturing of optical elements having a high refractive index (above 1.59).

More precisely, the present invention relates to a method for the manufacturing of an optical element having a refractive index above 1.59 by additive manufacturing to the optical element obtained by such a method and to an ophthalmic lens comprising such an optical element.

BACKGROUND OF THE INVENTION

In ophthalmic industry, it is desirable to have access to high refractive index polymers (i.e. above 1.59) to reduce the thickness of the prescription lenses when high diopter corrections are required.

Prescription plastic lenses exhibiting a high refractive index are usually manufactured by casting methods involving very long polymerization cycles of liquid monomer mixtures poured into a mould and hardened to result in a solid polymerized material. In particular, after filling with the liquid monomer mixture, the moulds are exposed to a thermal process for many hours depending on the nature of monomers. In the particular case of monomer mixtures leading to polymers having a high refractive index, the process is very long and can last for up to 48 hours.

High refractive index material in ophthalmic industry are usually formed from reactions between episulfide and thiol monomers or isocyanate-alcohol or thiol-isocyanate or thiol-alkene or thiol-alkyne or thiol-epoxy or thiol-(cyano)(meth) acrylate or combination of these later, regarding to chain growth polymerization and/or step growth polymerization. Patents applications such as for example EP 2 236 539, EP 2 980 113 or US 2016/0280840 describe polymerizable compositions useful in a casting process for the manufacturing of optical materials. Such mixtures of monomers are usually very reactive, hence not stable in time and may release a lot of heat resulting in a low shelf-life and in a risk for health and explosion (run-away reaction) if not controlled.

In the specific case of photopolymerization, several problems are to be considered. First of all, anionic polymerization requires the generation of efficient photobase. This generally goes with the release of a gas ($N_2$, $CO_2$) with can lead to optical defects in the final lens material. Further, the heat released by photopolymerization of monomers leads to i) optical defects due to rapid polymerization and also to the movement of monomers by heat convection, ii) anisotropic mechanical and thermal properties, and iii) risk to initiate a thermal front of polymerization (run-away reaction). Finally, the larger optical material piece which must be casted, the more difficult is control of heat release from polymerization and formation of defects as well.

On the other hand, there is currently a craze for material preparation processes by additive manufacturing and it would be very interesting to benefit from the advantages offered by this particular technology, especially from polymer jetting technology, in the manufacturing of ophthalmic elements. In particular, it would be very interesting to find high refractive index monomer compatible with additive manufacturing to be able to prepare ophthalmic elements with this promising tool. Such monomers must in particular react by a radical chain growth polymerization process while at the same time having a viscosity compatible with polymer jetting technology and leading to a polymer having the desired high refractive index.

However, it is very difficult to identify such monomers, in particular to balance viscosity of polymerizable composition and refractive index of final polymer. Acrylic/methacrylic monomers are often used as reactive solvents to lower viscosity but tends to decrease the refractive index of the corresponding final polymer. On the contrary, high refractive index monomers usually contain fluorene compounds or aromatic groups leading to highly viscous systems not compatible with polymer jetting technology.

Therefore, there is a need for a method allowing the manufacturing of ophthalmic elements having a high refractive index which would be faster than the traditional casting processes, leading to less defects and better isotropic properties of final optical material, overcoming problem of shelf-life and risk of run-away polymerization reaction and with a high level of safety.

The Applicant has found that under certain specific selected conditions this need could be met using a preparation process involving additive manufacturing.

SUMMARY OF THE INVENTION

A first object of the present invention is therefore a method for the manufacturing of an optical element having a refractive index above 1.59, said method comprising:
- a step of providing a predetermined build support,
- at least one step A of providing a predetermined volume of a liquid mixture of polymerizable compounds on said support,
- wherein
- the liquid mixture of polymerizable compounds comprises:
  - i) at least one compound C1 having at least one alkynyl functional group or at least two functional groups independently selected from the group consisting of alkenyl, isocyanato, episulfide and epoxy functional groups,
  - ii) at least one compound C2 having at least two terminal functional groups independently selected from the group consisting of mercapto and episulfide groups,
  - with the condition that at least one of C1 and C2 is different from a di-episulfide compound, and
  - iii) optionally at least one polymerization initiator,
- and wherein said method further comprises:
- at least one step B of additively manufacturing said optical element by depositing a plurality of predetermined volume elements of said liquid mixture of polymerizable compounds on said predetermined build support,
- at least one step C of inducing partial polymerization of the polymerizable compounds in said volume elements at least until the gel point of said liquid mixture of said polymerizable compounds is reached, a final step D of completing polymerization of the polymerizable compounds in said volume elements to form said optical element.

Thanks to this method and the judicious choice of compounds C1 and C2 in the mixture of polymerizable compounds, it is now possible to manufacture optical elements having a refractive index above 1.59 by additive manufacturing faster than by the traditional casting processes, with excellent optical properties and with a high level of safety. In particular, the selection of monomers compatible with addition polymerization and/or anionic polymerization processes allow to control more easily the viscosity of the mixture and improve compatibility with polymer jetting technology. The implementation of the method according to the present invention leads to two main advantages:
- the mixture between the monomers C1 and C2 can be done at the very last moment, thus overcoming shelf-life issues,
- the predetermined volume of the mixture of polymerizable compounds (either in the form of droplet or thin layer) is small, so that the heat generated by polymerization is more efficiently dissipated in air. Then, next volume of predetermined volume of the mixture of polymerizable compounds will not be heated by the polymerization reaction of the preceding predetermined volume, thus avoiding any risk of run-away polymerization reaction. Indeed, the run-away polymerization appears as a danger for operators and for the process line due to a low shelf-life and high heat releasing during monomer polymerization.

A second object of the present invention is an ophthalmic element obtained according to the method defined according to the above first object.

Finally, a third object of the present invention is an ophthalmic lens comprising at least one ophthalmic element as defined according to the above second object or obtained according to the method defined according to the above first object.

DETAILED DESCRIPTION

According to the invention, and as it is well known by one skilled in the art, the "gel point" corresponds to an abrupt change in the viscosity of the liquid mixture of polymerizable compounds. At the gel point, the liquid mixture undergoes gelation as reflected in a loss in fluidity. This definition can also be found in the IUPAC Goldbook according to which the gel point is the point of incipient network formation in a process forming a chemical or physical polymer network (https://goldbook.iupac.org/html/G/GT07535.html).

As already mentioned, a high refractive index in the sense of the present invention is a refractive index above 1.59, more preferably equal or above 1.64, and even more preferably equal or above 1.67.

Examples of suitable alkenyl compounds as compounds C1 include polyenes, especially vinylic polyenes such as divinylbenzene and allylic polyenes such as diallyl phthalate, diallyl isophthalate, diallyl cyanurate, diallyl isocyanurate, pentaerythritol diallyl ether, trimethylolpropane diallyl ether, glycerin diallyl ether, bisphenol A diallyl ether, bisphenol F diallyl ether, ethylene glycol diallyl ether, diethylene glycol diallyl ether, triethylene glycol diallyl ether, propylene glycol diallyl ether, dipropylene glycol diallyl ether and tripropylene glycol diallyl ether, 1,3,5-triallyl-1, 3,5-triazine-2,4,6(1H,3H,5H)-trione, 2,4,6-triallyloxy-1,3, 5-triazine, trimethylolpropane triallyl ether, pentaerythritol triallyl ether, diallyl carbonate, di(ethylene glycol) bis(allyl carbonate), and mixtures thereof.

Examples of suitable compounds having one alkynyl functional group and useful as compounds C1 include pentinyl alcohol, butinyl alcohol, propargyl alcohol and esters based on such alcohols. Suitable compounds may be selected from: 1,3,5-cyclohexanetricarboxylic acid; 1,3,5-tri-2-propyn-1-yl ester; 1,2-cyclopentanedicarboxylic acid; 1,2-di-3-butyn-1-yl ester; 1,2,3-propanetricarboxylic acid; 1,2,3-tri-2-propyn-1-yl ester; butanedioic acid esters; 1,4-di-3-butyn-1-yl ester; and butanedioic acid, esters, 1,4-di-2-propyn-1-yl ester.

Examples of suitable compounds having two isocyanato functional groups and useful as compounds C1 include monomers selected from symmetric aromatic diisocyanates such as 2,2'-methylene diphenyl diisocyanate (2,2' MDI), 4,4' dibenzyl diisocyanate (4,4' DBDI), 2,6 toluene diisocyanate (2,6 TDI), xylylene diisocyanate (XDI), 4,4' methylene diphenyl diisocyanate (4,4' MDI); asymmetric aromatic diisocyanates such as 2,4' Methylene diphenyl diisocyanate (2,4' MDI), 2,4' dibenzyl diisocyanate (2,4' DBDI), 2,4 toluene diisocyanate (2,4 TDI); alicyclic diisocyanates such as 1,3-bis(isocyanatomethyl)cyclohexane, isophorone diisocyanate (IPDI), 2, 5 (or 2, 6)-bis(iso-cyanatomethyl)-Bicyclo[2.2.1]heptane (NDI) and 4,4' Diisocyanato-methylenedicyclohexane (H12MDI); and aliphatic diisocyanates such as hexamethylene diisocyanate (HDI) and mixtures thereof.

Examples of suitable compounds having two episulfide functional groups and useful as compounds C1 include monomers selected from bis(2,3-epithiopropyl)sulfide, bis(2,3-epithiopropyl)disulfide, bis[4-(beta-epithiopropylthio)phenyl]sulfide, and bis[4-(beta-epithiopropyloxy)cyclohexyl]sulfide.

Examples of suitable compounds having two epoxy functional groups and useful as compounds C1 include monomers selected from 2,2'-(1,4-phenylene)bis(oxirane) (CAS 16832-58-9); 2,2'-bis(4-glycidyloxyphenyl)propane (CAS 1675-54-3); 7-oxabicyclo[4.1.0]heptane 3-carboxylic acid, 3,3'-(9H-fluoren-9-ylidenedi-4, 1-phenylene) ester (CAS 1175589-95-3); Bis(4-(oxiran-2-ymethoxy)phenyl)methane (CAS 2095-03-6); Tris(4-hydroxyphenyl)methane triglycidylether (CAS 43224-82-4); Bis(2,3-epoxypropoxy)naphthalene, in particular 1,6-Bis(2,3-epoxypropoxy)naphthalene (CAS 27610-48-6) and mixtures thereof.

Among these compounds C1, 2,5- (or 2,6)-bis(iso-cyanatomethyl)-Bicyclo[2.2.1]heptane (NDI); 1,3-bis(isocyanatomethyl)cyclohexane; 4,4'-Diisocyanato-methylenedicyclohexane; xylylene diisocyanate; bis(2,3-epithiopropyl)sulfide and bis(2,3-epithiopropyl)disulfide are particularly preferred.

Examples of suitable compounds useful as compounds C2 include monomers selected from pentaerythritol tetrakis mercaptopropionate, pentaerythritol tetrakis mercaptoacetate, ethylene glycol bis(3-mercaptoproprionate), tetraethylene glycol bis(3-mercaptoproprionate), bis(2-mercaptoethyl)sulfide, bis(2-mercaptoethyl)disulfide, bis(β-epithiopropyl)sulfide, bis(β-epithiopropyl)disulfide, 2,5-dimercaptométhyle-1,4-dithiane, 4-mercaptomethyl-3,6-dithia-1,8-octanedithiol, 4-mercaptomethyl-1,8-dimercapto-3,6-dithiaoctane, 2,5-dimercaptomethyl-1,4-dithiane, 2,5-bis[(2-mercaptoethyl)thiomethyl]-1,4-dithiane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane and mixture thereof.

According to a preferred embodiment of the present invention, the liquid mixture of polymerizable compounds is selected from mixtures comprising:
- at least one compound C1 as defined above and at least one compound C2 comprising two mercapto groups, or
- at least one compound C1 in which at least one of the two functional groups is an epoxy group and at least one compound C2 in which at least one of the two terminal functional groups is an episulfide group.

The weight ratio of compound C1/compounds C2 in the liquid mixture of polymerizable compounds may vary from about 10 to 0.1 and preferably from about 8 to 0.15, so as to respect stoichiometric ratio of polymerizable functions after mixing.

The liquid mixture of polymerizable compounds may further comprise one or more additional monomers selected from compounds comprising at least one functional group chosen among secondary amino, acrylic and esters groups. More specifically, when this additional monomer is a compound comprising at least one secondary amino group, then the C1 compound is a compound comprising two isocyanato functional groups.

The liquid mixture of polymerizable compounds may also further comprise nanoparticles (fillers), especially silica but also high refractive index (high means >1.6) nanoparticles such as alumina, or very high refractive index (very high means >1.8) nanoparticles such as titanium oxide, zirconium oxide, tantalum oxide, tin oxide, tungsten oxide, zinc oxide, zinc sulfide or mixtures thereof.

According to a preferred embodiment of the present invention, the polymerization initiator is chosen among double metal cyanides (DMC) catalysts, thermal catalysts, photobase generators (PBGs), radical photo-initiator and photo-acid generators (PAGs).

DMC catalysts are non-stoichiometric complexes of a low molecular weight organic complexing agent, and optionally other complexing agents, with a double metal cyanide salt, e.g. zinc hexacyanocobaltate.

Photobase generators are photolatent catalysts able to release a strong base and a radical upon irradiation with an active energy ray. They are generally chosen among benzoin carbamates, o-nitrobenzylcarbamates, o-acyloximes, ammonium salts, formamides, nifedipines, amineimides, α-aminoketones, o-carbamoyloximes and sulfonamides.

Suitable examples for a photobase generator include: m-nitrophenyl carbamate, 3,5-dimethoxybenzyl carbamate, α-methylnitropiperonyl carbamate, o-nitrobenzyl carbamate, 9-anthrylmethyl N,N-diethylcarbamate, 3,4-dimethoxy-6-nitrobenzyl carba mate, phenyl(o-nitrophenyl) methyl carbamate, 2-(2-nitrophenyl)ethyl carbamate, 6-nitroveratryl carbamate, 4-methoxyphenacyl carbamate, 3,5-dimethoxybenzoin carbamate. Other suitable photobase generators are disclosed in International Application WO 2017/099130 and are able to release 1,5-diazabicyclo[4.3.0]non-5-ene (DBN).

Photoacid generators are photolatent catalysts able to release a strong acid and a radical upon irradiation with an active energy ray. They are generally chosen among oniums salts. Suitable examples for a photoacid generator include:
- salts of aryldiazonium or diaryliodonium or triarylsulfonium or triarylselenonium or triarylphosphonium that contain complex halides such as $BF^-_4$, $SbF^-_6$, $AsFe^-$, $B(CeF_5)^-_4$ or $PF^-_6$ as counter ions,
- iron arene complexes that contain complex halides such as $BF^-_4$, $SbF^-_6$, $AsFe^-$, $B(CeF_5)^-_4$ or $PF^-_6$ as counter ions,
- dialkylphenacyl sulfonium salts that contain complex halides such as $BF^-_4$, $SbF^-_6$, $AsFe^-$, $B(CeF_5)^-_4$ or $PF^-_6$ as counter ions,
- 2-nitrobenzylester of carboxylic acids or 2-nitrobenzylester of sulfonic acids,
- sulfones compounds which generate sulfinic acid upon irradiation,
- triarylphosphates, imino sulfonates, trichloromethyl-1,3, 5-triazines, N-hydroxyimide sulfonates and/or mixtures thereof.

Radical photo-initiator are photolatent catalysts able to release a highly reactive radical species upon irradiation with an active energy ray According to a preferred embodiment of the present invention, the polymerization initiator is present is said predetermined volume in a concentration ranging from about 0.01. to 5 wt. %, in particular from 2.5 to 4.5% by weight, more particularly from 3.0 to 4.0% by weight, based on the total weight of said predetermined volume.

The predetermined volume is preferably a droplet or a layer. This predetermined volume is small and thus the heat generated by polymerization is more efficiently dissipated in air than with usual casting processes.

According to a preferred embodiment, said predetermined volume is a droplet whose size is chosen so as to avoid self-induced polymerization, preferably any run-away polymerization reaction. The size of the droplets may vary from about 1 to 60 μm, preferably from about 5 μm to 45 μm, and more preferably from about 15 μm to 35 μm.

According to a first and preferred embodiment of step B, and with reference to FIG. 1 annexed, step B of additively manufacturing can be carried out with a jetting system 1 comprising at least two compartments 2,2' and one jetting head 3, a first compartment 2 containing at least one compound C1 and a second compartment 2' comprising at least one compound C2, the optional polymerization initiator being present either in the first or the second compartment 2,2' and mixing of compound C1 with compound C2 is made at the level of the jetting head 3. According to this embodiment, the liquid mixture of compounds C1 and C2 is jet printed on a predetermined build support 4, for example in the form of droplets 5.

As an alternative the device represented on FIG. 1 may also comprise several jetting heads to form a row of heads (not represented), thus increasing productivity.

Figure 2:
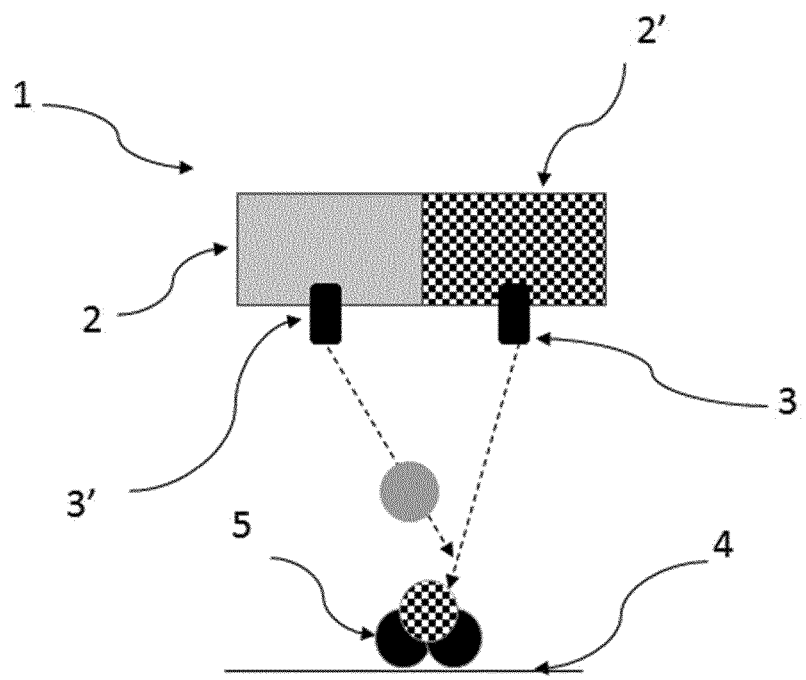

According to a second embodiment of step B, and with reference to FIG. 2 annexed, step B of additively manufacturing can also be carried out with a jetting system 1 comprising at least two jetting heads 3,3', a first compartment 2 containing at least one compound C1 and a second compartment 2' comprising at least one compound C2, the optional polymerization initiator being present either in the first or the second compartment 2,2', compound C1 being dropped through a first jetting head 3 and compound C2 being dropped through a second jetting head 3', and mixing of compound C1 with compound C2 is made in air just after jetting either at the level of the jetting heads 3, in flight or on said support 4 either at the same time of sequentially.

According to the present invention, steps A, B and C are repeated several times before performing final step D, to build a tridimensional material.

Step C can consist in inducing a partial polymerization of the polymerizable compounds in order to fix the volume elements at a given position while improving the collapsing of the volume elements together. The polymerizable compounds can be cured to reach the gel point by providing a precise heat or light quantity, thereby ensuring the volume elements to be fixed at the given position. During step C, the polymerizable compounds are preferably not fully cured.

In some embodiments wherein a radiation-curable system is used, such as for instance UV curable system, (i) the relative movement of conveyor between a light emitting device and the volume elements and/or (ii) the light intensity are controlled so that to reach the gel point of the polymerizable compounds of the volume elements without fully curing the polymerizable compounds. For UV-curable system, this step is also known as UV pinning.

In some embodiments wherein a thermally-curable system is used, (i) the relative movement of conveyor between a heating device and the volume elements and/or (ii) the heat quantity are controlled so that to reach the gel point of the polymerizable compounds of the volume elements without fully curing the polymerizable compounds.

In some embodiments, the partial polymerization is induced by adding an inhibitor of polymerization reaction in the liquid mixture of polymerizable compounds. In some embodiments, the inhibitor of the polymerization reaction comprises radical quencher/radical scavenger (e.g. oxygen) in the case of radical polymerization. In some embodiments, the inhibitor of the polymerization reaction comprises Brönsted or Lewis bases in case of cationic polymerization. In some embodiments, the inhibitor of the polymerization reaction comprises Brönsted or Lewis acid in the case of anionic polymerization.

Final step D of completing polymerization can be carried out either by applying radiations and/or by applying a thermal treatment.

More particularly, step D may encompass:
thermally-induced polymerization or radiation-induced polymerization;
thermally-induced polymerization and then radiation-induced polymerization;
radiation-induced polymerization and then thermally-induced polymerization; or
thermally induced polymerization and simultaneously radiation-induced polymerization.

When final step D is carried out by applying ultraviolet radiations, it can be performed in an UV oven or by exposition to an arc lamp emitting from 250 to 355 nm wavelength with a power between 20 to 160 W/cm.

When final step D is carried out by applying a thermal treatment, it can for example be performed in an oven or by exposition to an infrared light source. Typical temperature ranges from 60° C. to 120° C., for a cure cycle during from 30 minutes to 24 hours.

The ophthalmic element obtained according to the method defined above according to the first object of the present invention can be used for the manufacturing of an ophthalmic lens, in particular prescription lenses.

The ophthalmic lens may then be coated with one or more functional coatings selected from the group consisting of an anti-abrasion coating, an anti-reflection coating, an antifouling coating, an antistatic coating, an anti-fog coating, a polarizing coating, a tinted coating and a photochromic coating.

The invention will now be described in more detail with the following examples which are given for purely illustrative purposes and which are not intended to limit the scope of the invention in any manner

EXAMPLES

1. Chemicals Used
Optical materials were prepared from:

a first composition comprising 50.6 g of bisisocyanatonorbonane (CAS No. 74091-64-8) as compound C1, 1.8 g of Seesorb 701 (CAS No. 2440-22-4), and 0.04 g of dimethyltin dichloride as a thermal catalyst (CAS No. 753-73-1);- a second composition comprising 23.9 g of pentaerythritol tetrakis (3-mercaptopropionate) (CAS No. 7575-23-7) and 25.3 g of 2,3-bis((2-mercaptoethyl)thio)-1-propanethiol (CAS No. 131538-00-6) as compounds C2; and 2 g of 9-anthrylmethyl N,N-diethylcarbamate (CAS No. 1228312-05-7) solubilized in 2 g of ethyl acetate as photobase generator.

2. Preparation of an Optical Element

Optical element was built on a PMMA substrate by stacking multiple flat layers with different diameters, yielding a plano-convex structure.

High-end inkjet printer was used to precisely control drop placement.

First composition, second composition and photobase generator were stored in three compartments and mixed at the level of jetting head, which jets drops.

A UV pinning unit working at 250-355 nm was used to reach gel point for each drop.

After deposition of all droplets into a tridimensional material, full polymerization was reached by curing the element in an oven during 12 h at 80° C.

Resulting optical material had satisfactory features (transparency, mechanical properties) to be used as an ophthalmic lens.

The invention claimed is:

1. A method for the manufacturing of an optical element having a refractive index above 1.59, said method consisting of:
   a step of providing a predetermined build support,
   at least one step A of providing a predetermined volume of a liquid mixture of polymerizable compounds on said support,
   wherein,
   the liquid mixture of polymerizable compounds consists in:
   i) at least one compound C1 having at least one alkynyl functional group or at least two functional groups independently selected from the group consisting of alkenyl, isocyanato and epoxy functional groups,
   ii) at least one compound C2 having at least two terminal functional groups that are mercapto groups, and
   iii) optionally at least one polymerization initiator,
   and wherein said method further comprises:
   at least one step B of additively manufacturing said optical element by depositing a plurality of predetermined volume elements of said liquid mixture of polymerizable compounds on said predetermined build support,
   at least one step C of inducing partial polymerization of the polymerizable compounds in said volume elements at least until a gel point of said liquid mixture of said polymerizable compounds is reached,
   a final step D of completing polymerization of the polymerizable compounds in said volume elements to form said optical element.

2. The method according to claim 1, wherein the at least one compound C1 is at least one monomer chosen in the group comprising 2,5-(or 2,6)-bis(iso-cyanatomethyl)-Bicyclo[2.2.1]heptane; 1,3-bis(isocyanatomethyl)cyclohexane; 4,4'-Diisocyanato-methylenedicyclohexane and xylene diisocyanate.

3. The method according to claim 1, wherein the at least one compound C2 is at least one monomer chosen in the group comprising pentaerythritol tetrakis mercaptopropionate, pentaerythritol tetrakis mercaptoacetate, ethylene glycol bis(3-mercaptoproprionate), tetraethylene glycol bis(3-mercaptoproprionate), bis(2-mercaptoethyl)sulfide, bis(2-mercaptoethyl)disulfide, 2,5-dimercaptométhyle-1,4-dithiane, 4-mercaptomethyl-3,6-dithia-1,8-octanedithiol, 4-mercaptomethyl-1,8-dimercapto-3,6-dithiaoctane, 2,5-dimercaptomethyl-1,4-dithiane, 2,5-bis[(2-mercaptoethyl)thiomethyl]-1,4-dithiane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane and mixture thereof.

4. The method according to claim 1, wherein said predetermined volume is a droplet or a layer.

5. The method according to claim 1, wherein said predetermined volume is a droplet whose size is chosen so as to avoid self-induced polymerization.

6. The method according to claim 5, wherein the size of the droplet ranges from 1 µm to 60 µm.

7. The method according to claim 1, wherein said step B of additively manufacturing is carried out with a jetting system (1) comprising at least two compartments (2,2') and one jetting head (3), a first compartment (2) containing at least one compound C1 and a second compartment (2') comprising at least one compound C2.

8. The method according to claim 1, wherein said step B of additively manufacturing is carried out with a jetting system (1) comprising at least two jetting heads (3, 3'), a first compartment (2) containing at least one compound C1 and a second compartment (2') comprising at least one compound C2.

9. The method according to claim 1, wherein steps A, B and C are repeated several times before performing final step D, to build a tridimensional material.

10. The method according to claim 1, wherein said final step D of completing polymerization is carried out by applying ultraviolet or by a thermal treatment.

11. The method of claim 1, wherein the liquid mixture of polymerizable compounds further comprises at least one polymerization initiator.

12. The method according to claim 11, wherein the polymerization initiator is chosen among double metal cyanides catalysts, thermal catalysts, photobase generators, radical photo-initiator and photo-acid generators.

13. The method according to claim 11, wherein the polymerization initiator is present in said predetermined volume in a concentration ranging from 0.01 to 5 weight %, based on the total weight of said predetermined volume.

14. The method according to claim 11, wherein said step B of additively manufacturing is carried out with a jetting system (1) comprising at least two compartments (2,2') and one jetting head (3), a first compartment (2) containing at least one compound C1 and a second compartment (2') comprising at least one compound C2, the polymerization initiator being present either in the first or the second compartment (2,2') and mixing of compound C1 with compound C2 is made at the level of the jetting head (3).

15. The method according to claim 11, wherein said step B of additively manufacturing is carried out with a jetting system (1) comprising at least two jetting heads (3,3'), a first compartment (2) containing at least one compound C1 and a second compartment (2') comprising at least one compound C2, the polymerization initiator being present either in the first or the second compartment (2,2'), compound C1 being dropped through a first jetting head (3) and compound C2 being dropped through a second jetting head (3'), and mixing of compound C1 with compound C2 is made in air just after jetting either at the level of the jetting heads (3), in flight or on said support (4) either at the same time of sequentially.

16. The method according to claim 2, wherein compounds C2 are monomers chosen in the group comprising pentaerythritol tetrakis mercaptopropionate, pentaerythritol tetrakis mercaptoacetate, ethylene glycol bis(3-mercaptoproprionate), tetraethylene glycol bis(3-mercaptoproprionate), bis(2-mercaptoethyl)sulfide, bis(2-mercaptoethyl)disulfide, 2,5-dimercaptométhyle-1,4-dithiane, 4-mercaptomethyl-3,6-dithia-1,8-octanedithiol, 4-mercaptomethyl-1,8-dimercapto-3,6-dithiaoctane, 2,5-dimercaptomethyl-1,4-dithiane, 2,5-bis[(2-mercaptoethyl)thiomethyl]-1,4-dithiane, 4,8-dimercaptomethyl-1,11-dimercapto-3,6,9-trithiaundecane, 4,7-dimercaptomethyl1,11-dimercapto-3,6,9-trithiaundecane, 5,7-dimercaptomethyl-1,11-dimercapto-3,6,9-trithiaundecane and mixture thereof.

\* \* \* \* \*